United States Patent
Segal et al.

(10) Patent No.: US 6,952,444 B1
(45) Date of Patent: Oct. 4, 2005

(54) BLIND DFE AND PHASE CORRECTION

(75) Inventors: Mordechai Segal, Herzlia (IL); Ofir Shalvi, Berkeley, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/230,069

(22) PCT Filed: Jul. 18, 1997

(86) PCT No.: PCT/IB97/00903

§ 371 (c)(1),
(2), (4) Date: Apr. 25, 2000

(87) PCT Pub. No.: WO98/04073

PCT Pub. Date: Jan. 29, 1998

Related U.S. Application Data

(60) Provisional application No. 60/022,195, filed on Jul. 19, 1996.

(51) Int. Cl.[7] .............................................. H03H 7/30
(52) U.S. Cl. ...................... 375/232; 375/233; 375/235; 375/348
(58) Field of Search ............................... 375/348, 232, 375/233, 235, 229

(56) References Cited

U.S. PATENT DOCUMENTS

| | | | |
|---|---|---|---|
| 4,005,426 A | * | 1/1977 | White ......................... 342/370 |
| 4,843,583 A | * | 6/1989 | White et al. ................ 708/322 |
| 5,282,225 A | * | 1/1994 | Nikias et al. ................ 375/232 |
| 5,283,811 A | * | 2/1994 | Chennakeshu et al. ..... 375/233 |
| 5,297,166 A | | 3/1994 | Batruni ......................... 375/14 |
| 5,539,774 A | * | 7/1996 | Nobakht et al. ............. 375/232 |
| 5,550,596 A | * | 8/1996 | Strolle et al. ................ 348/607 |
| 5,568,558 A | * | 10/1996 | Ramm et al. ............... 381/94.4 |
| 5,572,262 A | * | 11/1996 | Ghosh ......................... 348/607 |
| 5,640,416 A | * | 6/1997 | Chalmers .................... 375/147 |
| 5,841,484 A | * | 11/1998 | Hulyalkar et al. .......... 348/607 |
| 5,970,093 A | * | 10/1999 | de Lantremange .......... 375/234 |

FOREIGN PATENT DOCUMENTS

| | | | | |
|---|---|---|---|---|
| EP | 0729254 A2 | 8/1996 | ........... | H04L 25/03 |
| WO | 95/09493 | 4/1997 | ........... | H04J 13/00 |

OTHER PUBLICATIONS

Hatzinakos, D., "Blind equalization using decision feedback prediction and tricepstrum principles", *Signal Processing*, 36, pp. 261-276, (1994).

* cited by examiner

*Primary Examiner*—Khai Tran
*Assistant Examiner*—David B. Lugo
(74) *Attorney, Agent, or Firm*—Carlton H. Hoel; W. James Brady; Frederick J. Telecky, Jr.

(57) ABSTRACT

The digital communications receiver receives an analog signal, modulated with digital information. The receiver converts the analogue signal to a digital signal, and demodulates the digital signal to recover the complex valued components of the transmitted digital signal. The complex valued components are low pass filtered and passed through an adaptive pre-equalizer filter, to reduce eigen value spread. The filtered complex valued signal is then subject to a decision feedback equalization, which operates using a series of adaptive filters additionally to remove artifacts of inter-symbol interference. The resulting filtered and equalized complex valued signal is the converted to a digital signal to recover the digital information.

11 Claims, 3 Drawing Sheets

$$S_2[n] = S_1[n] + \sum_{\ell=1}^{L} P_n[\ell]S_1[n-\ell] \quad (\ell \geq 0)$$

$$P_{n+1}[\ell] = P_n[\ell] + \Gamma_n(S_2[n]) \cdot S_1^*[n-\ell] \quad (\ell=1..L)$$

$$\Gamma_n(x) = \delta p[n] \cdot x$$

$S_3[n] = S_2[n] \cdot e^{j\theta[n]}$ , $\theta[n+1] = \theta[n] + \rho_n(S_5[n])$ $S_4[n] = \sum_{m=1}^{M} C_n[m]S_3[n-m]$ , $C_{n+1}[m] = C_n[m] + \psi_n(S_5[n])S_3^*[n-m]$ $(M \geq 1, N \geq 0)$ $S_5[n] = S_4[n] + \sum_{i=1}^{N} d_n[i]\hat{a}[n-i]$ , $d_{n+1}[i] = d_n[i] + \psi_n(S_5[n])\hat{a}^*[n-i]$

BLIND DFE AND PHASE CORRECTION

This application claims the benefit of Provisional application Ser. No. 60/022,195, filed Jul. 19, 1996.

FIELD OF THE INVENTION

The present invention relates to digital communication methods and systems.

BACKGROUND OF THE INVENTION

Modems for digital communications systems are designed to cope with various channel impairments. An essential element of the modem is the start-up process in which modem parameters such as equalizer taps, carrier frequency error, timing error, and gain setting, are estimated in order to provide the required modem performance.

In the prior art, two training modes are used: 1) using a known transmitted data sequence; 2) or using the transmitted information data without any prior knowledge of the value of the transmitted data. The latter mode is known as a blind start-up.

In the prior art, it is difficult to perform a blind start-up process, with limited computational resources and to converge to a good initial setting of the modem parameters for channels that exhibit severe linear distortion which gives rise to severe inter-symbol interference (ISI), and channels that suffer from severe narrow-band interference.

Therefore, there is a need in the art to provide a solution for the blind start-up process of a receiver in the context of digital communications signals in the presence of severe ISI and severe narrow-band interference. There is an additional need in the art to provide relief from ISI and severe narrow-band interference for conventional blind and non-blind modems.

SUMMARY OF THE INVENTION

The present invention is a method and apparatus for a digital communication receiver which is capable of operating over channels with severe ISI and narrow-band interference in either blind or non-blind modems.

The receiver of the present invention receives an analog signal modulated with digital information. The receiver converts the analog signal to a digital signal and demodulates the digital signal to recover the complex valued components of the transmitted digital signal. The complex valued components are low pass filtered and passed rough an adaptive pre-equalizer filter to reduce eigen value spread correlation. The filtered complex valued signal is then subjected to a decision feedback equalizer which operates using a series of adaptive filters to additionally remove artifacts of inter-symbol interference. The resulting filtered and equalized complex valued signal is the converted to a digital signal to recover the digital information.

DETAILED DESCRIPTION OF PREFERRED EMBODIMENT

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

Figure 1:
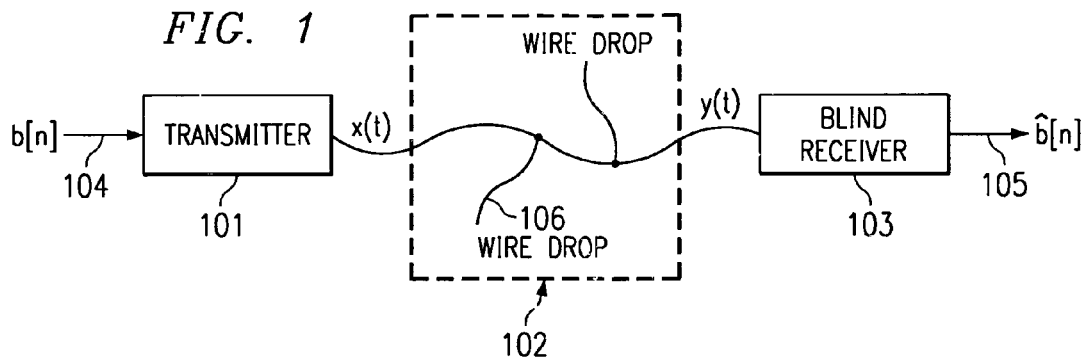
FIG. 1 depicts a digital communications system which employs the invention in a preferred embodiment.

Reference is made to FIG. 1 which illustrates a typical application of a digital communications system operating over UTP (Unshielded Twisted Pair) copper cables plant 102 or another communication medium such as coaxial cable. The present invention is applicable to many types of communication mediums, and in particular to a digital subscriber loop of a telephone network or a coaxial cable television infrastructure. The system comprises a transmitter 101 that receives a sequence 104 of data bits b[n], and outputs a signal x(t) to the cable. A wired communications medium 102, such as a copper cable plant, connects the transmitter 101 to the blind receiver 103. The blind receiver 103 receives a signal y(t) from the communications medium 102 and outputs a sequence of detected digital data bits $\hat{b}$[n] 105.

The communications medium or cable plant may have one or more unterminated wire drops 106, as illustrated in FIG. 1, and these wire drops may cause severe rejections that distort the signal and introduce significant inter-symbol interference (ISI).

Figure 2:
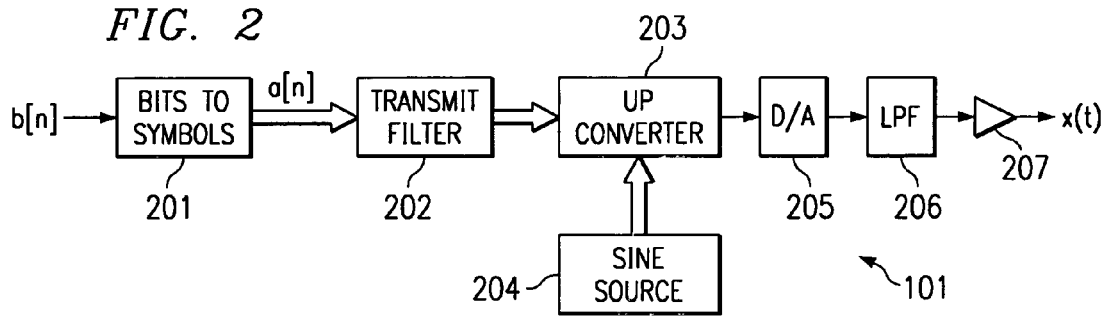
FIG. 2 describes the transmitter in the preferred embodiment of FIG. 1.

Reference is made now to FIG. 2, which describes the structure of the transmitter 101. In FIG. 2, the single-lined arrows indicate the propagation of real valued signals and the double-lined arrows indicate the propagation of complex whenever the term "complex valued" is used herein, it encompasses either imaginary or real valued signals or the combination of the two which is a complex valued signals. The transmitter 101 operates according to a general approach of linear transmission that particularly includes any one of PAM (Pulse Amplitude Modulation), QAM (Quadature Amplitude Modulation), PSK (Phase Shift Keying), CAP (Carrierless AM-PM), and NRZ (Non-Return to Zero) transmission methods, among others. The input data bits sequence b[n] is converted to a sequence of I-Q complex valued symbols, a[n], by a bit-to-symbol conversion unit 201, that may comprise a scrambler, a differential encoder, a trellis or a block FEC (Forward Error Correction) encoder, a CRC error protection encoder, a framer, a shell mapper, and/or protocol layer units.

The sequence a[n] is then fed to a cascade of transmission filter 202, an up-converter 203, where it is multiplied by sine and cosine sequences that are generated in the sine wave source 204, a Digital to Analog (D/A) converter 205, an analog LPF (Low Pass Filter) 206 whose cutoff frequency is designed to reject aliasing effects of the D/A, and an amplifier 207. The output of the transmitter is the analog signal x(t).

Figure 3:
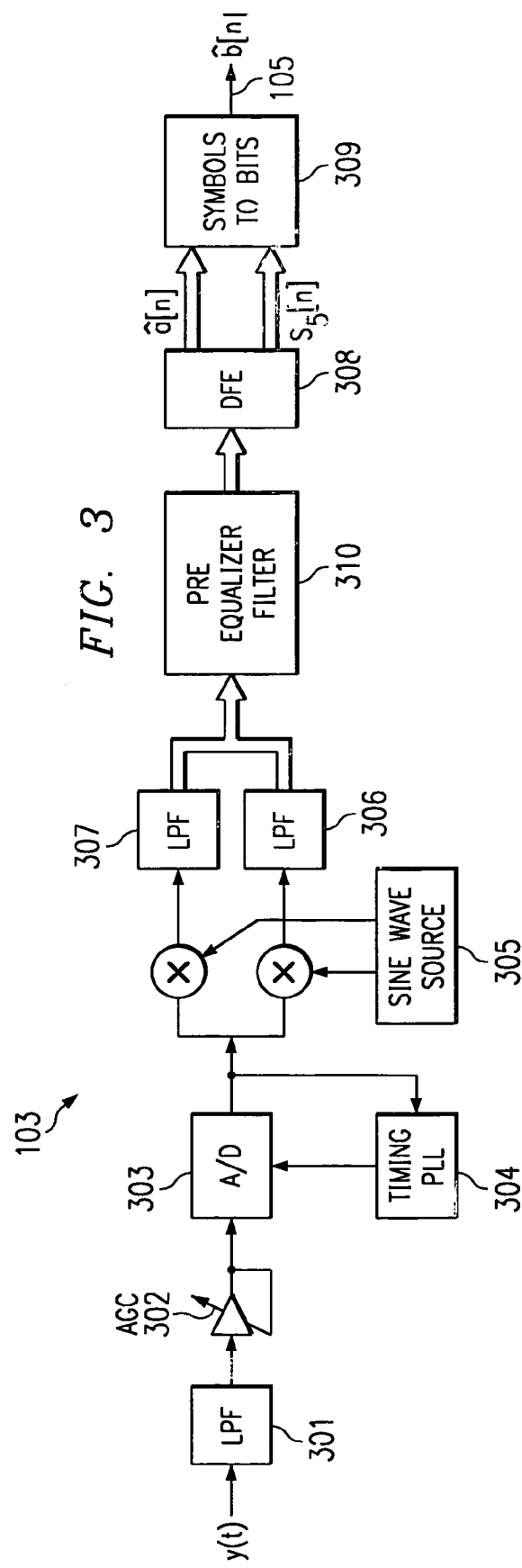
FIG. 3 describes the structure of the receiver in the preferred embodiment.

Reference is now made to FIG. 3 which illustrates the structure of the blind receiver 103. The input to the blind receiver is an analog signal y(t) that has propagated through the wired communications medium 102, such as a copper cable plant. This signal may suffer from severe reflections and linear distortions and it may contain a high level of noise and interference components due to e.g. narrow-band radio transmissions which occupy the same frequency band of the signal y(t).

The receiver input signal is low-pass filtered by the LPF 301 which is designed to combat sampling aliasing effects, then it is amplified by an amplifier 302 whose gain is automatically adjusted with an Automatic Gain. Control (AGC) to exploit the dynamic range of sampler, and then the signal is sampled by Analog to Digital converter (A/D) 303. The sampling phase of the A/D is adaptively controlled by a timing PLL (phase locked loop) 304, which adjusts the sampling phase so that the power of the A/D output is maximized. Those skilled in the art will readily recognize that the timing PLL 304 may alternatively employ other conventional timing methods, such as decision directed timing.

The A/D output sequence is then down-converted by multiplying it with sine and cosine sequences that are synthesized in a sine wave source 305, and the resulting I and Q components are low pass filtered by the LPFs 306 and 307. Both LPFs 306 and 307 are designed to remove the demodulation image, to remove out-of-band signals, and to match the response frequency of the cascade of the transmission pulse response of transmit filter 202 of a typical cable plant or other communication medium 102 upon which the system operates.

The LPF units' outputs are then processed by a pre-equalizer filter unit 310, whose operation is described below in conjunction with FIG. 4, and a Decision Feedback Equalizer (DFE) unit 308, whose operation is described below in conjunction with FIG. 5. The output of the DFE unit 308 is a sequence of detected I-Q symbols â(n) and an equalized sequence $s_5[n]$. These sequences are then processed by a symbol-to-bits conversion unit 309 that performs the inverse function of the bits-to-symbols conversion unit 201 and may employ a descrambler, differential decoder, FEC decoders, deframer, shell demapper, and/or a protocol layer decoder. The output of this unit is a sequence of the detected data bits $b[n]$ 105.

Figure 4:
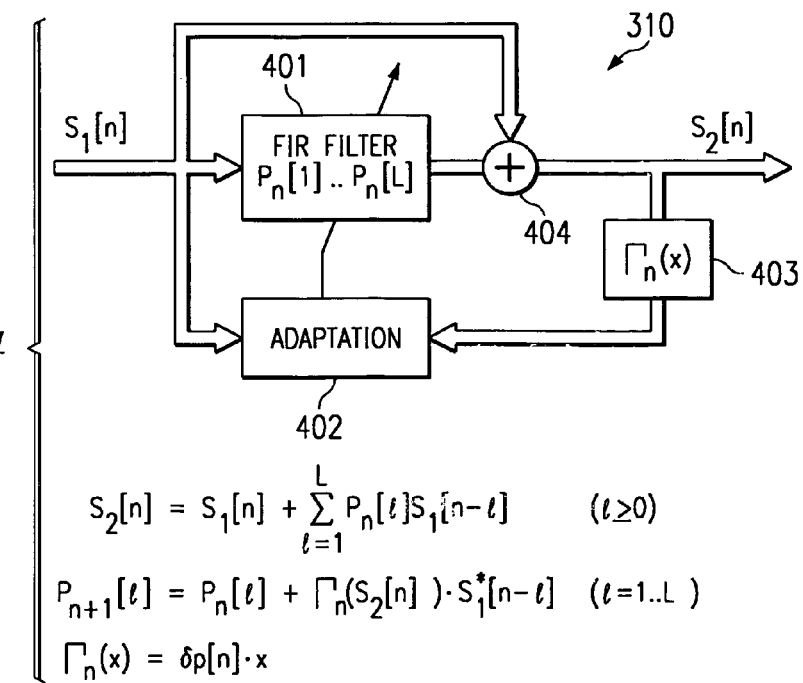
FIG. 4 describes the operation of the pre-equalizer filter unit of the receiver in the preferred embodiment.

FIG. 4 illustrates the pre-equalizer filter unit 310. The input sequence of the unit, $s_1[n]$ is filtered by a digital FIR (Finite Impulse Response) filter 401 with L taps $p_n[1]$ ... $p_n[L](L \geq 0)$ where $p_n[l]$ (denotes the l-th tap after n iterations. The taps of the filter are adaptively adjusted by an adaptation unit 402. The adaptation rule is:

$$p_{n+1}[l]=p_n[l]+\Gamma_n(s_2[n])s_1*[n-l]l=1 \ldots L$$

where $s_2[n]$ is the output of the FIR filter 401, and where $\Gamma_n(x)$ is a possibly nonlinear function 403 whose parameters may vary with the iteration index n. A recommended class of $\Gamma$ function is:

$$\Gamma_n(x)=\delta_p[n]\cdot x$$

where $\delta_p[n]n=1,2,\ldots$ is a sequence of step sizes. The signal undergoes the following transformation:

$$s_2[n] = s_1[n] + \sum_{l=1}^{L} p_n[l]s_1[n-l] \quad (L \geq 0)$$

The input signal for the pre-equalization filter unit 310 is denoted $s_1[n]$ in FIG. 4 and is routed to the FIR filter 401, the adaptation unit 402 and to summation circuit 404. $s_1[n]$ is combined with the output of the adaptive FIR filter 401 to produce the output signal $s_2[n]$ of the pre-equalization filter unit 310. The non-linear circuit 403 modifies the $s_2[n]$ signal to provide the feedback to adjusting the taps if adaptive FIR filter 401.

Figure 5:
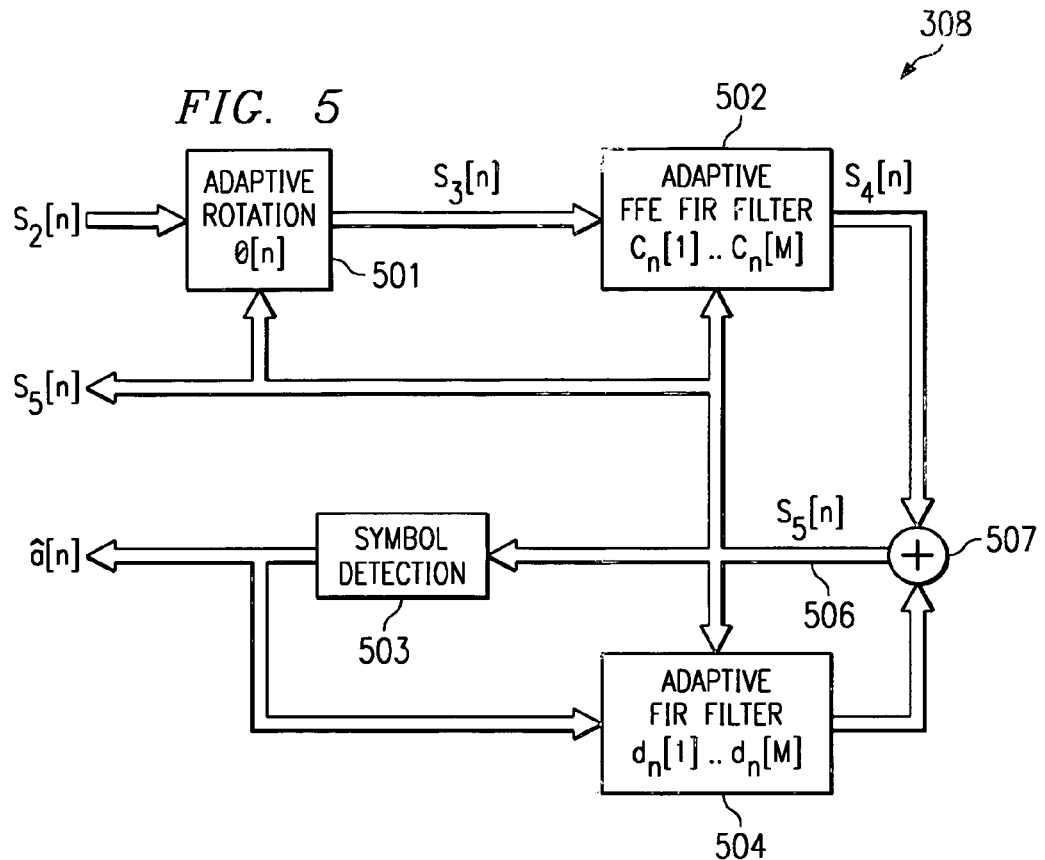
FIG. 5 describes operation of the DFE (Decision Feedback Equalizer) in the receiver of the preferred embodiment

FIG. 5 illustrates the DFE (Decision Feedback Equalizer). The DFE's input sequence $s_2[n]$ is first rotated by an adaptive rotator 501, by an angle $\theta[n]$. The rotated sequence is then filtered by an FFE (Feed Forward Equalizer) FiR filter 502 whose taps' values are $c_n[1] \ldots c_n[M](M \geq 1)$, to produce output signal $s_4[n]$. Signal $s_4[n]$ is then summed 507 with the output of an adaptive FIR filter 504 whose taps are $d_n[1] \ldots d_n[N]$, $N \geq 0$, and which is driven by the sequence of detected symbols â[n]. The result of this summation is equalized sequence $s_5[n]$, 506. The sequence 506 is fed to a symbol detector 503 that employs a memoryless nearest neighbor decision rule, based on the transmitted symbols' I-Q constellation to generate the sequence â[n]. We note that in this preferred embodiment, a single memoryless decision rule is employed. However, the present invention can be employed in a receiver that employs a more accurate detection scheme such as an approximate nearest sequence detector which is the maximum likelihood sequence estimator when the noise of the input of unit 503 has a Gaussian distribution.

The parameters of units 501, 502 and 504 are jointly updated by $S_5[n]$ to combat ISI (Inter-Symbol Interference) and noise. The adaptation scheme is the following:

$$\theta[n+1]=\theta[n]+p_n(s_5[n])$$

$$c_{n+1}[m]=c_n[m]+\phi_n(s_5[n])s_3*[n-m]m=1 \ldots M$$

$$d_{n+1}[i]=d_n[i]+\Psi_n(s_5[n])\hat{a}*[n-i]i=1 \ldots N$$

where $p_n(x)$, $\phi_n(x)$, and $\Psi_n(x)$ are possibly nonlinear complex valued scalar function whose parameters may depend on the iteration index n, and $M \geq 1$, $N \geq 0$.

The adaptation functions in this embodiment are:

$$\varphi_n(x) = \begin{cases} \delta_c[n](x - \hat{a}(x)) & n > T_2^c \\ \delta_c[n](|x|^2 - k_1)x & T_1^c \leq n < T_2^c \\ \delta_c[n](Re^2(x) - k_2)Re(x) & n < T_1^c \end{cases}$$

$$\rho_n(x) = \begin{cases} \delta_\theta[n](Re^2(x) - k_2)Re(x)Im(x) & n < T_1^\theta \\ \delta_\theta[n]Im(\hat{a}(x)x'') & n \geq T_1^\theta \end{cases}$$

$$\Psi_n(x) = \begin{cases} \delta_d[n](x - \hat{a}(x)) & n > T_2^d \\ \delta_d[n](|x|^2 - k_1)x & T_1^d \leq n < T_2^d \\ \delta_d[n](Re^2(x) - k_2)Re(x) & n < T_1^d \end{cases}$$

where $\delta_c[n]$, $\delta_d[n]$ and $\delta_\theta[n]$,n=1, 2, ..., are sequences of real-valued step sizes, where $k_1$ and $k_2$ are real valued scalars, and where Re(−) and Im(−) denote the real part and the imaginary part of a complex scalar, and where â(x) is the result of a memoryless nearest neighbor symbol detector whose input is x. $T_1^c$, $T_2^c$, $T_1^\theta$, $T_1^d$ and $T_2^d$ are positive scalars.

The sequences $s_1[n] \ldots s_5[n]$, â[n] may be calculated at the symbols rate (T-spaced receiver). Alternatively $s_2[n]$, $s_3[n]$ and $s_4[n]$ may be calculated at a higher rate (Fractionally spaced receiver). The resulting outputs of units 501, 502 and 504 are described as follows:

$$s_3[n] = s_2[n] \cdot e^{j\beta[n]}$$

$$s_4[n] = \sum_{m=1}^{M} c_n[m] s_3[n-m]$$

$$s_5[n] = s_4[n] + \sum_{l=1}^{N} d_n[l] \hat{a}[n-l]$$

CONCLUSION

Although specific embodiments have been illustrated and described herein, it will be appreciated by those of ordinary skill in the art that any arrangement which is calculated to achieve the same purpose may be substituted for the specific embodiments shown. This patent is intended to cover any adaptations or variations of the present invention. Therefore, it is manifestly intended that this invention be limited only by the claims and the equivalents thereof.

We claim:

1. A communication receiver, comprising:
   an input for receiving a modulated analog signal containing digital information;
   a front end unit operable for performing analog-to-digital conversion, for performing demodulation and for performing timing control, and further operable for producing a demodulated complex-valued digital signal from the modulated analog signal;
   a digital equalizer connected for receiving the demodulated complex-valued digital signal, comprising:
      a first filter operable for receiving the demodulated complex-valued digital signal, said first filter with adaptive coefficients where adaptation is according to the following formula:

$p_{n+1}[l] = p_n[l] + \Gamma_n(s_2[n]) s_1^*[n-l] \, l=1, \ldots, L$ where $p_n[l]$ is the l-th tap of the first filter after calculation of n outputs, $p_n[0]=1$, $s_1[n]$ is the input sequence to the first filter, $s_2[n]$ is the output of the first filter, and $\Gamma_n(.)$ is a function whose parameters may depend upon a symbol index n;
      a second filter connected to the first filter and operable for reducing the amount of noise and inter-symbol interference in the demodulated complex-valued digital signal without the use of training data; and
   a symbol-to-bit converter connected to the second filter;
   wherein the second filter further comprises an M-tap FIR filter whose taps are adjusted according to the following formula:

$c_{n+1}[m] = c_n[m] + \phi_n(s_5[n]) s_3^*[n-m] \, m=1, \ldots, M$ where $c_n[m]$ is the m-th tap of the second filter after calculation of n outputs, $s_3[n]$ is the input sequence to the second filter, $s_5[n]$ is the sum of the output of the second filter and a decision feedback filter, and $\phi_n$ is a complex-valued function, whose parameters may depend upon a symbol index n;
   and the decision feedback filter is an N-tap backward FIR filter whose taps are adjusted according to the following formula:

$d_{n+1}[i] = d_n[i] + \Psi_n(s_5[n]) \hat{a}^*[n-i] \, i=1, \ldots, N$ where $d_n[i]$ is the i-th tap of the decision feedback filter after calculation of n outputs, $\hat{a}[n]$ is a sequence of detected data, and $\Psi_n(.)$ is a complex-valued function, whose parameters may depend on the symbol index n.

2. The communication receiver according to claim 1, wherein for some values of n:

$\phi_n(x) = \delta[n](\text{Re}^2(x) - k_2)\text{Re}(x)$ where Re(.) denotes the real part of a complex number, $k_2$ is a scalar, and $\delta[n]$ for n=1, 2, ... is a sequence of numbers.

3. The communication receiver according to claim 1, where for some values of n:

$\phi_n(x) = \delta[n](|x|^2 - k)(x)$ where k is a scalar, and $\delta[n]$ is a sequence of numbers.

4. The communication receiver according to claim 1, where for some values of n:

$\phi_n(x) = \delta[n](x - \hat{a}(x))$ where $\hat{a}(x)$ is a result of a memoryless nearest neighbor symbol detector whose input is x, and $\delta[n]$ is a sequence of numbers.

5. The communication receiver according to claim 1, where for some values of n:

$\Psi_n(x) = \delta[n](\text{Re}^2(x) - k)\text{Re}(x)$ where Re(.) denotes the real part of a complex number, k is a scalar, and $\delta[n]$ for n=1, 2, ... is a sequence of numbers.

6. The communication receiver according to claim 1, where for some values of n:

$\Psi_n(x) = \delta[n](|x|^2 - k)(x)$ where k is a scalar, and $\delta[n]$ is a sequence of numbers.

7. The communication receiver according to claim 1, where for some values of n:

$\Psi_n(x) = \delta[n](x - \hat{a}(x))$ where $\hat{a}(x)$ is a result of a memoryless nearest neighbor symbol detector whose input is x, and $\delta[n]$ is a sequence of numbers.

8. A communication receiver, comprising:
   an input for receiving a modulated analog signal containing digital information;
   a front end unit operable for performing analog-to-digital conversion, for performing demodulation and for performing timing control, and further operable for producing a demodulated complex-valued digital signal from the modulated analog signal;
   a digital equalizer connected for receiving the demodulated complex-valued digital signal, comprising:
      a first filter operable for receiving the demodulated complex-valued digital signal, said first filter with adaptive coefficients where adaptation is according to the following formula:

$p_{n+1}[l] = p_n[l] + \Gamma_n(s_2[n]) s_1^*[n-l] \, l=1, \ldots L$ where $p_n[l]$ is the l-th tap of the first filter after calculation of n outputs, $p_n[0]=1$, $s_1[n]$ is the input sequence to the first filter, $s_2[n]$ is the output of the first filter, and $\Gamma^n(.)$ is a function whose parameters may depend upon a symbol index n;
   a second filter connected to the first filter and operable for reducing the amount of noise and inter-symbol interference in the demodulated complex-valued digital signal without the use of training data; and
   a symbol-to-bit converter connected to the second filter;

wherein the second filter further comprises:
an adaptive rotator connected to receive the demodulated complex-valued digital signal;
an adaptive feed forward equalizer finite impulse response filter connected to the adaptive rotator;
a signal summation circuit connected to the adaptive feed forward equalizer finite impulse response filter and to an adaptive finite impulse response filter, the output of which is connected to update the adaptive rotator, the adaptive feed forward equalizer finite impulse response filter and the adaptive finite impulse response filter;
a symbol detector connected to the signal summation circuit and the symbol-to-bit convertor; and
the adaptive finite impulse response filter connected to the symbol detector and operable for adapting to the summation result of the signal summation circuit.

9. A digital communication receiver, comprising:
an input stage for receiving a modulated analog signal containing digital information;
an analog-to-digital converter connected for producing a complex-valued digital signal from the modulated analog signal;
a demodulator connected for producing a demodulated complex-valued digital signal from the complex-valued digital signal;
a pre-equalizer filter connected to receive the demodulated complex-valued digital signal, comprising:
  a first adaptive finite impulse response filter having an output, having a tap adjustment input and connected to receive the demodulated complex-valued digital signal;
  a first summation circuit connected to sum the demodulated complex-valued digital signal with the output of the first adaptive finite impulse response filter to produce a pre-equalized complex-valued signal;
  a function circuit connected to receive the pre-equalized complex-valued signal and operable for producing therefrom a non-linear response to the pre-equalized complex-valued signal;
  an adaptation unit connected to receive the demodulated complex-valued digital signal, connected for receiving the non-linear response and connected to the tap adjustment input of the first adaptive finite impulse response filter to provide an adjustment to the first adaptive finite impulse response filter;
a digital decision feedback equalizer connected to receive the pre-equalized complex-valued signal, comprising:
  a rotator having an adaptive input and connected to receive the pre-equalized complex-valued signal and operable for restoring a phase of input data contained in the pre-equalized complex-valued signal without the use of training data;
  a feed forward equalizer finite impulse response filter having an adaptive input, an input connected to the rotator, an output, and operable for adaptively reducing an amount of noise and inter-symbol interference in the pre-equalized complex-valued signal without the use of training data;
  a second summation circuit connected to sum the output of the feed forward equalizer finite input response filter with an output of a second adaptive finite response filter and for producing therefrom a corrected complex-valued signal;
  a symbol detector connected to receive the corrected complex valued signal and to produce a symbol signal;
  the second adaptive finite impulse response filter having an output, an adaptive input and connected to receive the symbol signal;
  wherein the corrected complex-valued signal is connected to the adaptive input of the rotator, the adaptive input of the feed forward equalizer finite impulse response filter and the adaptive input of the second adaptive finite impulse response filter; and
a symbol-to-bit converter connected to receive the symbol signal and to produce therefrom digital bits corresponding to the digital information.

10. A method of receiving a digital communication signal in the presence of inter-symbol interference, comprising the steps of:
receiving an analog signal modulated with digital information;
converting the analog signal to produce a digital signal;
multiplying the digital signal with sine and cosine signals to produce a complex-valued digital signal;
adaptively pre-equalizing the complex-valued digital signal to produce a pre-equalized complex-valued digital signal;
adaptively equalizing the pre-equalized complex-valued digital signal to reduce the inter-symbol interference and to produce a corrected complex valued symbol signal without the use of training data; and
converting the corrected complex-valued symbol signal to the digital information;
wherein the step of adaptively pre-equalizing further comprises the steps of:
adaptively filtering the complex-valued digital signal with an adaptive filter to produce a filtered complex-valued digital signal
summing the complex-valued digital signal with the filtered complex-valued digital signal to produce the pre-equalized complex-valued digital signal;
producing a non-linear response to the pre-equalized complex-valued digital signal; and
modifying taps of the adaptive filter in response to the non-linear response to the pre-equalized complex-valued digital signal and in response to the complex-valued digital signal.

11. A method of receiving a digital communication signal in the presence of inter-symbol interference, comprising the steps of:
receiving an analog signal modulated with digital information;
converting the analog signal to produce a digital signal;
multiplying the digital signal with sine and cosine signals to produce a complex-valued digital signal;
adaptively pre-equalizing the complex-valued digital signal to produce a pre-equalized complex-valued digital signal;
adaptively equalizing the pre-equalized complex-valued digital signal to reduce the inter-symbol interference and to produce a corrected complex valued symbol signal without the use of training data; and converting the corrected complex-valued symbol signal to the digital information;

wherein the step of adaptively equalizing further comprises the steps of:

adaptively rotating the pre-equalized complex-valued digital signal to produce a rotated complex-valued signal;

adaptively filtering the rotated complex-valued signal to produce a filtered rotated complex-valued signal;

summing the filtered rotated complex-valued signal with an adapted filter output to produce an adapted complex-valued signal;

detecting the symbols in the adapted complex-valued signal to produce the corrected complex-valued symbol signal; and producing the adapted filter output by adaptively filtering the corrected complex-valued symbol signal.

* * * * *